(12) United States Patent
Balchandran et al.

(10) Patent No.: US 7,707,027 B2
(45) Date of Patent: Apr. 27, 2010

(54) IDENTIFICATION AND REJECTION OF MEANINGLESS INPUT DURING NATURAL LANGUAGE CLASSIFICATION

(75) Inventors: Rajesh Balchandran, Congers, NY (US); Linda Boyer, Ossining, NY (US)

(73) Assignee: Nuance Communications, Inc., Burlington, MA (US)

( * ) Notice: Subject to any disclaimer, the term of this patent is extended or adjusted under 35 U.S.C. 154(b) by 1031 days.

(21) Appl. No.: 11/279,577

(22) Filed: Apr. 13, 2006

(65) Prior Publication Data

US 2007/0244692 A1 Oct. 18, 2007

(51) Int. Cl.
*G06F 17/27* (2006.01)
(52) U.S. Cl. ............... 704/9; 704/1; 704/257; 704/256; 704/256.1; 704/256.2
(58) Field of Classification Search ............ 704/9, 704/1, 10, 257; 707/9, 1, 257, 256.1, 256.2
See application file for complete search history.

(56) References Cited

U.S. PATENT DOCUMENTS

| | | | |
|---|---|---|---|
| 5,383,120 A | 1/1995 | Zernik | |
| 5,467,425 A * | 11/1995 | Lau et al. | 704/243 |
| 5,982,933 A | 11/1999 | Yoshii et al. | |
| 6,587,818 B2 | 7/2003 | Kanevsky et al. | |
| 6,925,432 B2 | 8/2005 | Lee et al. | |
| 2002/0116174 A1* | 8/2002 | Lee et al. | 704/9 |
| 2004/0215457 A1 | 10/2004 | Meyer | |
| 2004/0220797 A1* | 11/2004 | Wang et al. | 704/9 |
| 2005/0060643 A1 | 3/2005 | Glass et al. | |
| 2005/0114313 A1 | 5/2005 | Campbell et al. | |
| 2006/0129397 A1* | 6/2006 | Li et al. | 704/245 |
| 2007/0078653 A1* | 4/2007 | Olsen | 704/240 |

* cited by examiner

*Primary Examiner*—Qi Han
(74) *Attorney, Agent, or Firm*—Wolf, Greenfield & Sacks, P.C.

(57) ABSTRACT

A method for identifying data that is meaningless and generating a natural language statistical model which can reject meaningless input. The method can include identifying unigrams that are individually meaningless from a set of training data. At least a portion of the unigrams identified as being meaningless can be assigned to a first n-gram class. The method also can include identifying bigrams that are entirely composed of meaningless unigrams and determining whether the identified bigrams are individually meaningless. At least a portion of the bigrams identified as being individually meaningless can be assigned to the first n-gram class.

19 Claims, 4 Drawing Sheets

200

| Unigrams | Bigrams | Trigrams |
|---|---|---|
| I | I want | I want to |
| want | want to | want to transfer |
| to | to transfer | to transfer some |
| transfer | transfer some | transfer some money |
| some | some money | some money into |
| money | money into | money into my |
| into | into my | into my checking |
| my | my checking | my checking account |
| checking | checking account | |
| account | | |

| Unigrams | Category |
|---|---|
| I | Nonsensical |
| want | Nonsensical |
| to | Nonsensical |
| transfer | Ambiguous |
| some | Nonsensical |
| money | Ambiguous |
| into | Nonsensical |
| my | Nonsensical |
| checking | Ambiguous |
| account | Ambiguous |

| Bigrams | Category |
|---|---|
| I want | Nonsensical |
| want to | Nonsensical |
| to transfer | Ambiguous |
| transfer some | Ambiguous |
| some money | Nonsensical |
| money into | Nonsensical |
| into my | Nonsensical |
| my checking | Ambiguous |
| checking account | Ambiguous |

| Trigrams | Category |
|---|---|
| I want to | Nonsensical |
| want to transfer | Ambiguous |
| to transfer some | Ambiguous |
| transfer some money | Meaningful |
| some money into | Nonsensical |
| money into my | Nonsensical |
| into my checking | Ambiguous |
| my checking account | Ambiguous |

IDENTIFICATION AND REJECTION OF MEANINGLESS INPUT DURING NATURAL LANGUAGE CLASSIFICATION

BACKGROUND OF THE INVENTION

1. Field of the Invention

The present invention relates to language processing and, more particularly, to natural language classification.

2. Description of the Related Art

Oftentimes there is a need to classify a user input specified in natural language into one or more classes or actions to interpret their meaning. Such classification of natural language input is the basis for many "understanding" applications. An example of such an application is a natural language call routing application where calls are transferred to an appropriate customer service representative or self-service application based on the natural language user input. For example, in response to receiving the user input "I have a problem with my printer" during a call session, a call routing application can route the call to a printer specialist.

FIG. 1 is a block diagram that depicts a conventional natural language classification system 100. The classification system 100 may include a classifier 105 that receives a natural language user input (hereinafter "user input") 110 and classifies the user input 110 as a particular type of request to generate a natural language classification result 115. The user input 110 can be provided as spoken words, typed text or in any other form.

More particularly, one or more statistical models 120 generated by a statistical model trainer 125 are used by the statistical classifier 105 at runtime to classify text or phrases contained in the user input 110 into likely classes of request types. These models 120 typically are generated from a corpus of domain specific phrases 130, 135, 140 of likely user requests, referred to as "training data" 145, which are separated into the classes 150, 155, 160 based on the actions implied in the phrases 130-140. When a user input 110 is classified into at least one of the known classes 150-160, this action is referred to as "closed set classification". Conversely, "open set classification" occurs when the user input 110 not only can be classified into at least one of the known classes 150-160, but also can be identified as not matching any known classes 150-160.

Speech recognition systems frequently generate incoherent and incomplete phrases owing to background noise, callers getting cut-off, or callers speaking outside the domain of the speech recognition system. In such situations, the best recourse is to reject the input and seek clarification from the caller. Unfortunately, classifiers of the prior art are not able to adequately identify when natural language user input does not match any known classes in a statistical model. Thus, instead of seeking clarification from the caller, such classifiers often incorrectly classify natural language user inputs, which results in calls being incorrectly routed. Accordingly, a classifier is needed that more accurately identifies when natural language user inputs do not match any known classes.

SUMMARY OF THE INVENTION

The present invention relates to a method for identifying data that is meaningless and generating a natural language statistical model which can reject meaningless input. The method can include identifying unigrams that are individually meaningless from a set of training data. At least a portion of the unigrams identified as being meaningless can be assigned to a first n-gram class. The method also can include identifying bigrams that are entirely composed of meaningless unigrams and determining whether the identified bigrams are individually meaningful. At least a portion of the bigrams identified as being individually meaningless can be assigned to the first n-gram class.

Another embodiment of the present invention can include a machine readable storage being programmed to cause a machine to perform the various steps described herein.

BRIEF DESCRIPTION OF THE DRAWINGS

There are shown in the drawings, embodiments which are presently preferred, it being understood; however, that the invention is not limited to the precise arrangements and instrumentalities shown.

FIG. 2 depicts a table of n-grams contained in a sentence which is useful for understanding the present invention.

FIG. 3 depicts a table in which the unigrams of FIG. 2 are categorized.

FIG. 4 depicts a table in which the bigrams of FIG. 2 are categorized.

FIG. 5 depicts a table in which the trigrams of FIG. 2 are categorized.

DETAILED DESCRIPTION OF THE INVENTION

Figure 1:
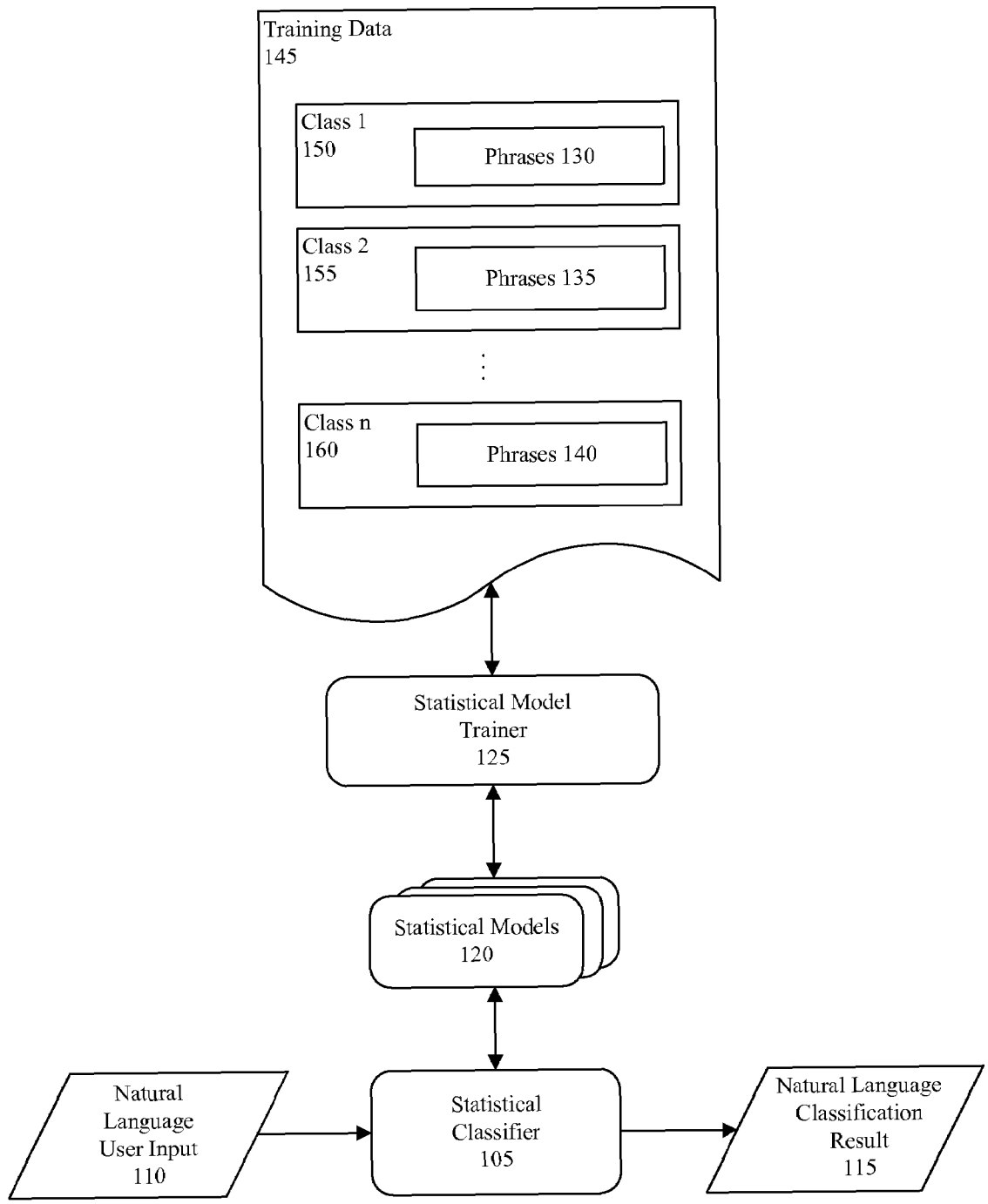
FIG. 1 is a block diagram that depicts a conventional natural language classification system.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to a technique that processes a collection of natural language phrases to identify and categorize n-grams that are meaningless in the context of not being able to individually identify an action to be initiated by an understanding application. Such n-grams can be categorized as nonsensical or ambiguous. As used herein, an n-gram is one or more contiguous words in a phrase. Examples of n-grams are "I", which is a unigram, "I want", which is a bigram, and "I want to", which is a trigram. For instance, consider the following sentence:

I want to transfer some money into my checking account. The unigrams, bigrams and trigrams contained in this sentence are shown in the table 200 of FIG. 2. Although only unigrams, bigrams and trigrams are depicted, higher order n-grams can be generated for the sentence. The higher order n-grams can comprise any number of sequential words or terms less than or equal to the number of words or terms contained in the sentence. In that regard, the order of an n-gram corresponds to the number words or terms in the n-gram.

The n-grams contained in a phrase can be categorized based on their relevance. For example, the n-grams can be categorized as meaningful, ambiguous or nonsensical. FIG. 3 depicts a table 300 in which the unigrams of FIG. 2 are categorized. Many of the unigrams, for example "I", "want", "to", etc. are nonsensical by themselves. Other unigrams, for example "transfer", "money", "checking", etc. are categorized as ambiguous. Still, other unigrams may be meaningful and can be classified as such. As used herein, "meaningful" n-grams are n-grams that, by themselves, identify a specific action to which they correlate. As used herein, "nonsensical" n-grams are meaningless n-grams that, by themselves, do not identify a specific action to which they correlate. As used herein, "ambiguous" n-grams are meaningless n-grams that, by themselves, identify a plurality of actions to which they may potentially correlate. As used herein, "meaningless" n-grams are n-grams that are nonsensical and/or ambiguous.

FIG. 4 depicts a table 400 in which the bigrams of FIG. 2 are categorized. Bigrams which contain at least one meaningful unigram can be automatically classified as meaningful. Bigrams which are entirely composed of nonsensical and/or ambiguous unigrams can be identified and then inspected for categorization as meaningful, nonsensical, or ambiguous.

Similarly, FIG. 5 depicts a table 500 in which the trigrams of FIG. 2 are categorized. Trigrams which contain at least one meaningful bigram can be automatically classified as meaningful. Trigrams which are entirely composed of nonsensical and/or ambiguous bigrams can be identified and then inspected for categorization as meaningful, nonsensical, or ambiguous.

In one arrangement, the categorization of the n-grams entirely composed of nonsensical and/or ambiguous lower order n-grams can be performed manually. In another arrangement, the categorization of the n-grams can be performed in a semi-automated process. An example of a semi-automated process can include manually categorizing unigrams. The manually categorized unigrams then can be referenced by an application that uses the categorized unigrams to automatically generate a list of bigrams that are composed entirely of meaningless unigrams. Such bigrams can be identified as being potentially meaningful. The potentially meaningless bigrams can be examined manually and categorized as meaningful or meaningless. The application then can identify trigrams that are entirely composed of meaningless bigrams. Such trigrams then can be manually examined and categorized as meaningful or meaningless. The process can continue until n-grams of any desired order are categorized. It should be noted that this invention is not limited to this example and that other approaches are possible.

Figure 6:
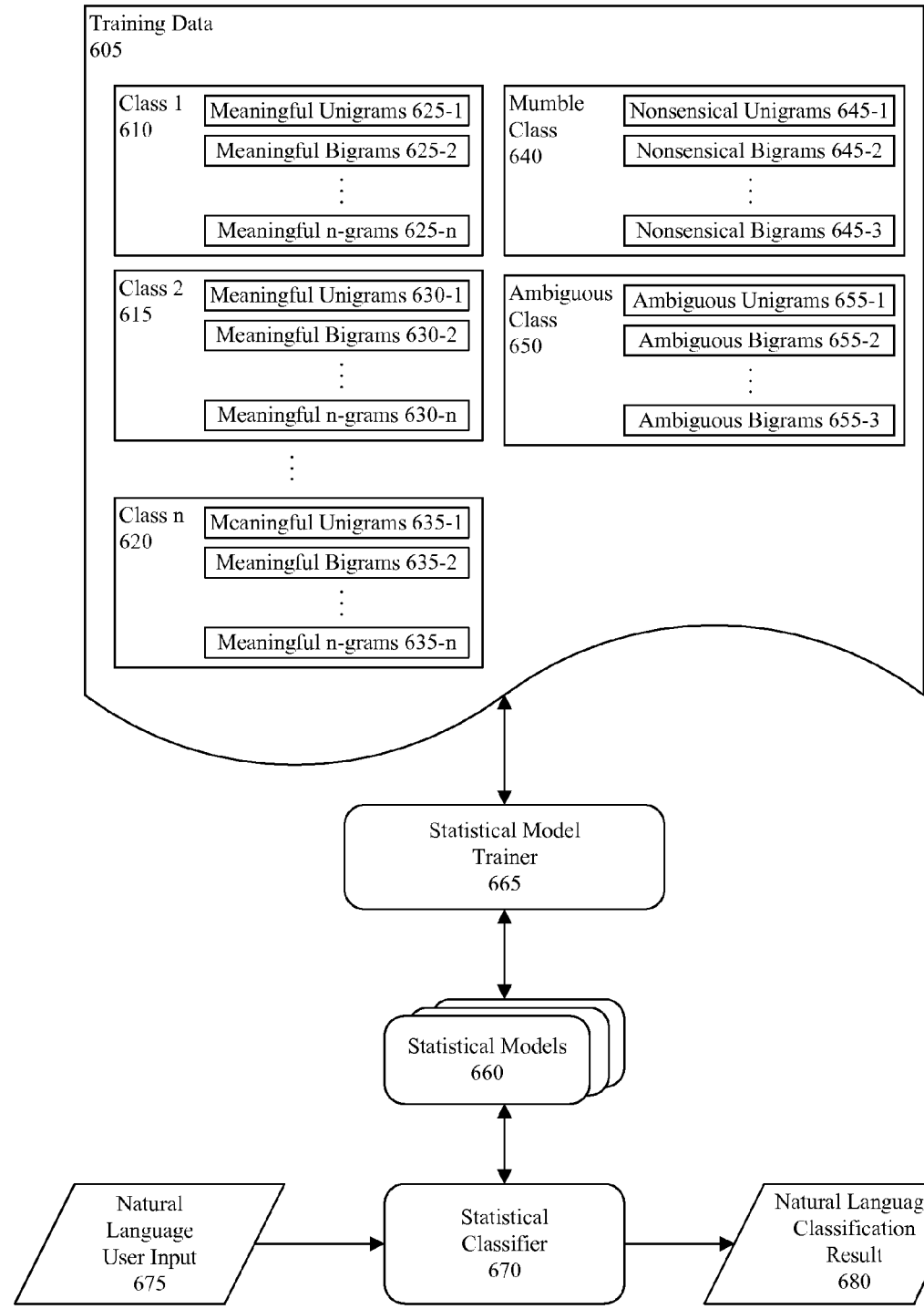
FIG. 6 is a block diagram that depicts a natural language classification system in accordance with one embodiment of the present invention.

FIG. 6 is a block diagram that depicts a natural language classification system 600 in accordance with one embodiment of the present invention. The system 600 can include training data 605 that is categorized into a plurality of n-gram classes 610, 615, 620. The classes 610-620 can be based on actions relevant to processes performed by an understanding application that will use statistical models 660 generated from the training data 605.

Each class 610-620 can include a group of n-grams 625, 630, 635 that are meaningful to the respective classes. For example, n-grams identified as being meaningful in tables 300-500 can be allocated to at least one of the classes 610-620 to which they are relevant. The allocation of n-grams to the classes 610-620 can be performed manually, or performed semi-automatically. For example, sentences can be classified into one of the classes 610-620 and associated n-grams can be assigned to the same class 610. Alternatively, higher order n-grams (e.g. bigrams, trigrams, etc.) comprising lower order n-grams that are meaningful and allocated to a particular class 610 can be automatically allocated to the same class 610.

The training data 605 also can be categorized to include a class ("mumble class") 640 of nonsensical n-grams 645. For example, n-grams identified as being nonsensical in tables 300-500 can be allocated to the mumble class 640. In addition, the training data 605 also can include a class ("ambiguous class") 650 of ambiguous n-grams 655. For example, n-grams identified as being ambiguous in tables 300-500 can be allocated to the ambiguous class 650. It should be noted that although one ambiguous class 650 is depicted, a plurality of ambiguous classes can be included in the training data 605 as sentences can be ambiguous between different sets of classes.

In addition to the meaningful n-grams 610-620, the non-sensical and/or ambiguous n-grams 640, 650 can be used to generate statistical models 660 which recognize meaningful data as well as nonsensical and/or ambiguous input data. The statistical models 660 can be generated by a statistical model trainer 665 using training data 605 or generated by a model generating application (not shown). The statistical classifier 670 then can use such models 660 to classify natural language user input 675 and generate a natural language classification result 680.

Use of the statistical models 660 that recognize nonsensical and/or ambiguous input data, in addition to classifying meaningful input data, helps the statistical classifier 670 to be more adept at being able to reject nonsensical and ambiguous user inputs 675 in comparison to statistical classifiers of the prior art. In particular, because the statistical models 660 identify n-grams that constitute meaningless fragments rather than attempting to know all possible meaningless phrases, the statistical models 660 overcome the problem of needing to be aware of or predict meaningless input that will be received by the statistical classifier 670 at runtime. Further, use of an incremental approach as described herein to categorize the n-grams makes the number of n-grams that need to be examined much smaller than otherwise would be needed to perform an exhaustive inspection of all n-grams comprising the training data 605.

Figure 7:
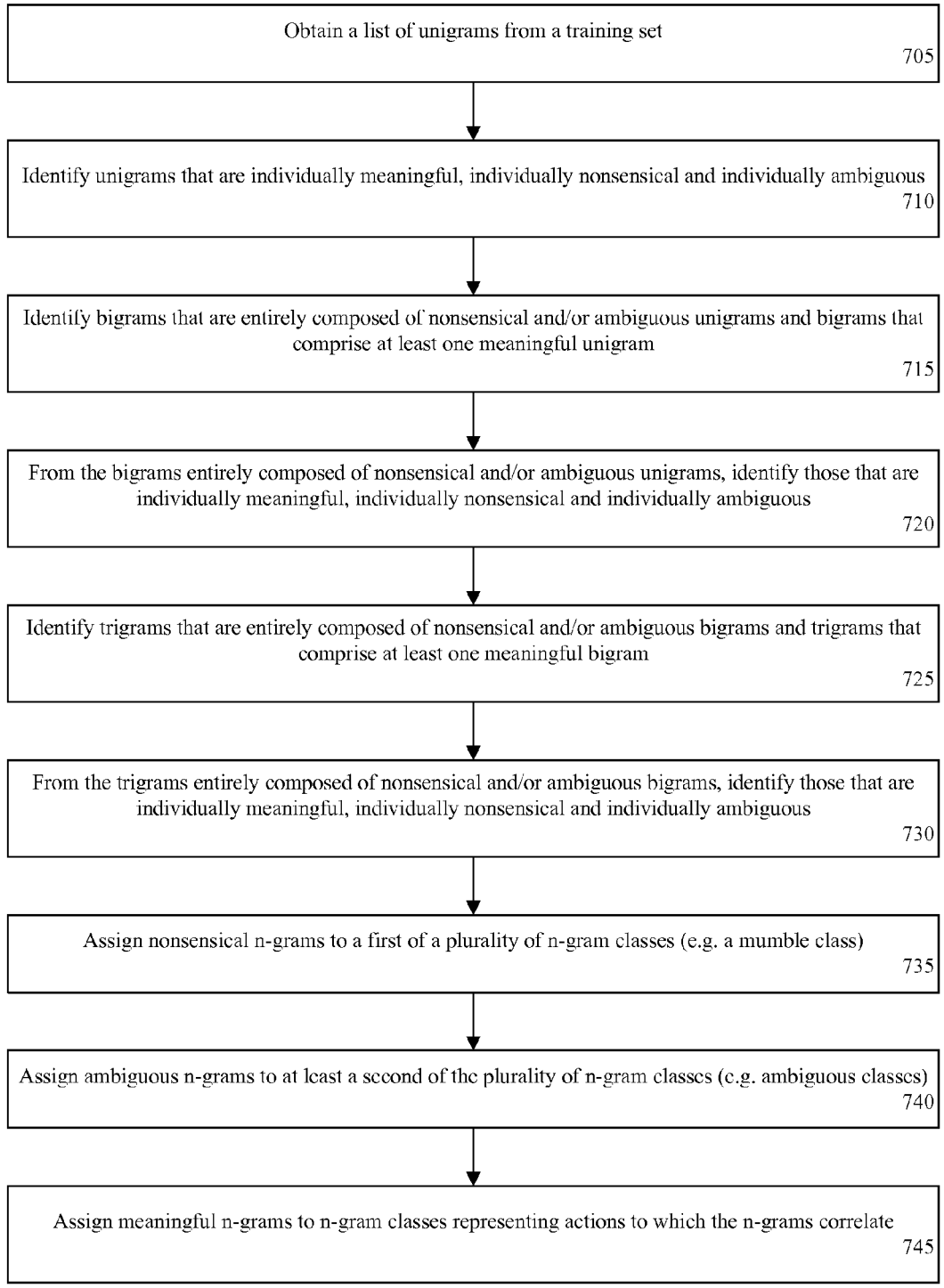
FIG. 7 is a flow chart illustrating a method of categorizing a set of training data in accordance with another embodiment of the present invention.

FIG. 7 is a flow chart illustrating a method 700 of categorizing a set of training data in accordance with another embodiment of the present invention. Beginning at step 705, a list of unigrams can be obtained from the training set. At step 710, unigrams can be identified that are individually meaningful, individually nonsensical and individually ambiguous. In addition, bigrams that comprise at least one meaningful unigram can be automatically identified and optionally examined for being meaningful.

At step 715, bigrams can be identified that are entirely composed of nonsensical and/or ambiguous unigrams. At step 720, from the bigrams that are entirely composed of nonsensical and/or ambiguous unigrams, those that are individually meaningful, individually nonsensical and individually ambiguous can be identified.

At step 725, trigrams can be identified that are entirely composed of nonsensical and/or ambiguous bigrams. At step 730, from the trigrams that are entirely composed of nonsensical and/or ambiguous bigrams, those that are individually meaningful, individually nonsensical and individually ambiguous can be identified. In addition, trigrams that comprise at least one meaningful bigram can be automatically identified and optionally examined for being meaningful.

Proceeding to step 735, nonsensical n-grams can be assigned to a first of a plurality of n-gram classes, for example a mumble class. At step 740, ambiguous n-grams can be assigned to at least a second of the plurality of n-gram classes. For example, the ambiguous n-grams can be assigned to one or more ambiguous classes. At step 745, meaningful n-grams can be assigned to n-gram classes representing actions to which the n-grams correlate. Bigrams which were identified as being meaningful can be assigned to the classes to which meaningful unigrams that they comprise are assigned. Similarly, trigrams which were identified as being meaningful can be assigned to the classes to which meaningful bigrams that they comprise are assigned.

Notably, the method 700 can continue for classification of n-grams having higher order than the trigrams (e.g. quadgrams, pentagrams, sesgrams, etc.).

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof Accordingly, reference should be made to the following claims, rather than to the foregoing specification, as indicating the scope of the invention.

What is claimed is:

1. A method for generating a natural language statistical model comprising:
   receiving, at at least one system comprising a combination of hardware and software, a set of training data comprising unigrams identified as being individually meaningless;
   assigning, via the at least one system, at least a portion of the unigrams identified as being meaningless to a first n-gram class selected from a plurality of n-gram classes; and
   processing the classified training data via the at least one system to generate the natural language statistical model.

2. The method according to claim 1, wherein assigning the unigrams that are individually meaningless comprises categorizing the unigrams into at least one class selected from the group consisting of a nonsensical class and at least one ambiguous class.

3. The method according to claim 2, wherein assigning at least a portion of the unigrams comprises assigning unigrams that are categorized as nonsensical into the first n-gram class and assigning unigrams that are categorized as ambiguous into at least a second n-gram class selected from the plurality of n-gram classes.

4. The method according to claim 1, further comprising:
   identifying bigrams that are entirely composed of meaningless unigrams;
   determining whether the identified bigrams are individually meaningless; and
   assigning at least a portion of the bigrams identified as being individually meaningless to the first n-gram class.

5. The method according to claim 4, further comprising categorizing the identified bigrams into at least one class selected from the group consisting of a nonsensical class and at least one ambiguous class.

6. The method according to claim 4, further comprising:
   identifying trigrams that are entirely composed of meaningless bigrams;
   determining whether the identified trigrams are individually meaningless; and
   assigning at least a portion of the trigrams identified as being individually meaningless to the first n-gram class.

7. The method according to claim 6, further comprising categorizing the identified trigrams into at least one class selected from the group consisting of a nonsensical class and at least one ambiguous class.

8. The method according to claim 1, wherein the training data further comprise unigrams identified as being individually meaningful, and wherein the method further comprises:
   identifying bigrams that comprise at least one of the unigrams identified as being meaningful; and
   categorizing the identified bigrams as meaningful.

9. The method according to claim 8, further comprising assigning at least a portion of the bigrams categorized as meaningful into a second n-gram class to which unigrams comprising the bigrams are assigned.

10. The method according to claim 1, wherein the training data further comprise bigrams identified as being individually meaningful, the method further comprising:
    identifying trigrams that comprise at least one of the bigrams identified as being meaningful; and
    categorizing the identified trigrams as meaningful.

11. The method according to claim 10, further comprising assigning at least a portion of the trigrams categorized as meaningful into a second n-gram class to which bigrams comprising the trigrams are assigned.

12. A method for generating a natural language statistical model comprising:
    receiving, at at least one system comprising a combination of hardware and software, a set of training data comprising unigrams identified as being individually meaningless;

assigning, via the at least one system, at least a portion of the unigrams identified as being meaningless to a first n-gram class selected from a plurality of n-gram classes;

identifying bigrams that are entirely composed of meaningless unigrams;

determining whether the identified bigrams are individually meaningless;

assigning, via the at least one system, at least a portion of the bigrams identified as being individually meaningless to the first n-gram class; and processing the classified training data via the at least one system to generate the natural language statistical model.

13. A machine readable storage having stored thereon a computer program having a plurality of code sections comprising:

code for identifying unigrams that are individually meaningless from a set of training data;

code for assigning at least a portion of the unigrams identified as being meaningless to a first n-gram class selected from a plurality of n-gram classes; and code for processing the classified training data to generate at least one statistical model.

14. The machine readable storage of claim 13, wherein the code for assigning the unigrams that are individually meaningless comprises code for categorizing the unigrams into at least one class selected from the group consisting of a nonsensical class and at least one ambiguous class.

15. The machine readable storage of claim 14, wherein the code for assigning at least a portion of the unigrams comprises code for assigning unigrams that are categorized as nonsensical into the first n-gram class and assigning unigrams that are categorized as ambiguous into at least a second n-gram class selected from the plurality of n-gram classes.

16. The machine readable storage of claim 13, further comprising:

code for identifying bigrams that are entirely composed of meaningless unigrams;

code for determining whether the identified bigrams are individually meaningless; and code for assigning at least a portion of the bigrams identified as being individually meaningless to the first n-gram class.

17. The machine readable storage of claim 16, further comprising code for categorizing the identified bigrams into at least one class selected from the group consisting of a nonsensical class and at least one ambiguous class.

18. The machine readable storage of claim 16, further comprising:

code for identifying trigrams that are entirely composed of meaningless bigrams;

code for determining whether the identified trigrams are individually meaningless; and code for assigning at least a portion of the trigrams identified as being individually meaningless to the first n-gram class.

19. The machine readable storage of claim 18, further comprising code for categorizing the identified trigrams into at least one class selected from the group consisting of a nonsensical class and at least one ambiguous class.

* * * * *